United States Patent [19]

Phillips, Jr.

[11] 4,156,982

[45] Jun. 5, 1979

[54] SUPPORT FOR FISHING ROD

[76] Inventor: Lewis Phillips, Jr., 398 Dollar Mill Ct. SW., Atlanta, Ga. 30331

[21] Appl. No.: 853,293

[22] Filed: Nov. 21, 1977

[51] Int. Cl.² ............................................. A01K 97/10
[52] U.S. Cl. .................................. 43/21.2; 43/54.5 R; 248/538
[58] Field of Search .................. 43/21.2, 25.2, 54.5 R, 43/56; 248/520, 538, 534

[56] References Cited

U.S. PATENT DOCUMENTS

| 2,617,616 | 11/1952 | Lavender | 248/538 |
| 2,626,770 | 1/1953 | Norman | 248/534 |
| 3,389,489 | 6/1968 | Burns | 43/21.2 X |
| 3,571,964 | 3/1971 | Bogathy | 43/21.2 |
| 3,659,369 | 5/1972 | Hermanson | 43/21.2 |
| 4,014,128 | 3/1977 | Hrdlicka | 43/21.2 |

FOREIGN PATENT DOCUMENTS 522496  3/1956  Canada ................................. 248/538

Primary Examiner—Nicholas P. Godici
Attorney, Agent, or Firm—Newton, Hopkins & Ormsby

[57] ABSTRACT

A sturdy and substantially unitary support for a fishing rod has spaced parallel plates which may straddle a bridge railing or the gunwale of a boat. The plates are rigidly connected by a trough which can serve as a storage space for additional tackle and fishing items. Above the trough, the spaced plates are notched and apertured to support a fishing rod at a convenient angle.

6 Claims, 2 Drawing Figures

SUPPORT FOR FISHING ROD

BACKGROUND OF THE INVENTION

Many types of fishing rod holders and supports are known in the prior art and some examples of the patented prior art which are relevant to the present invention are the following U.S. Pat. Nos.

2,236,070 3,543,432
3,162,970 3,601,919
3,835,568.

Typically, the prior art fishing rod supports are fabricated from metal and usually involve several components which must be assembled to form the finished article. Metal stampings and some machined parts are commonly employed.

Some disadvantages of these prior art structures include cost of manufacturing, excessive complexity in some instances, the tendency of metal to rust, and lack of rigidity in the case of wire holders. In many instances, the prior art devices are not unitary and parts can be mislaid or lost.

In light of the above, the present invention seeks to fulfill a need in the art for a fishing rod support of increased utility without increased cost which is rigid and essentially unitary and very durable. The holder embodying the invention can be formed of wood and therefore is not subject to rusting. It is very sturdy and therefore able to withstand rough usage over a long period of time. It can be fabricated with no movable or adjustable parts, although in one preferred form, a single adjustable clamping screw is provided.

A unique feature of the invention resides in the provision of a general utility trough which serves to connect the two spaced plates of the device in a very rigid manner, the trough serving the dual purpose as a receptacle for various fishing items and accessories, such as flashlight, sinkers, lures, hook dislodgers and many other items which customarily are housed separately in expensive tackle boxes, not always in ready reach of the fisherman in times of need.

In essence, therefore, the invention is a combination rod support or holder and storage receptacle for accessories, where a trough forming the storage receptacle forms a very efficient connecting member between the two spaced parallel plates of the device which support the fishing rod above the trough and straddle the railing of a bridge or boat gunwale during use.

DETAILED DESCRIPTION

Figure 1:
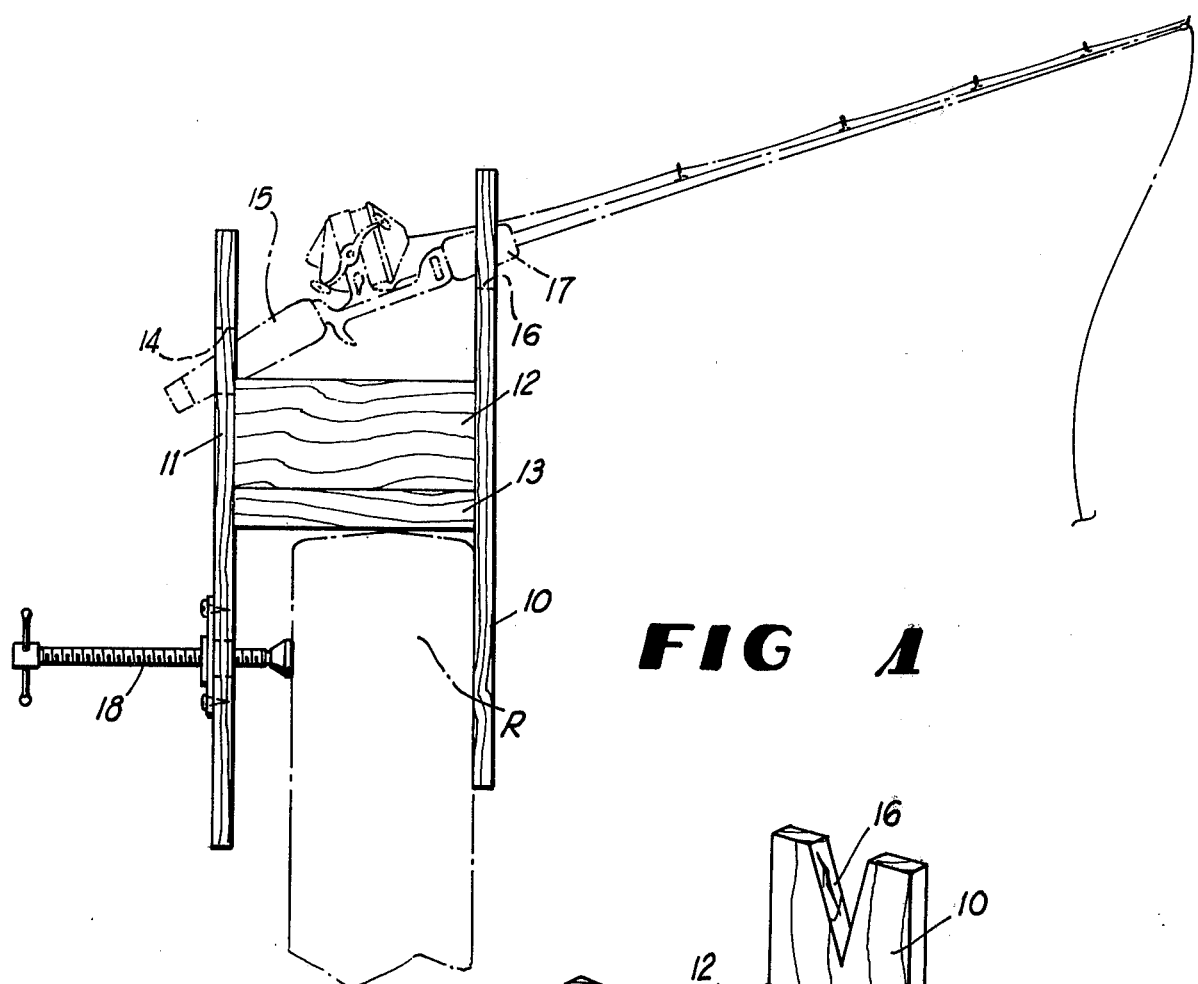
FIG. 1 is a side elevation of the invention showing the use thereof.
Figure 2:
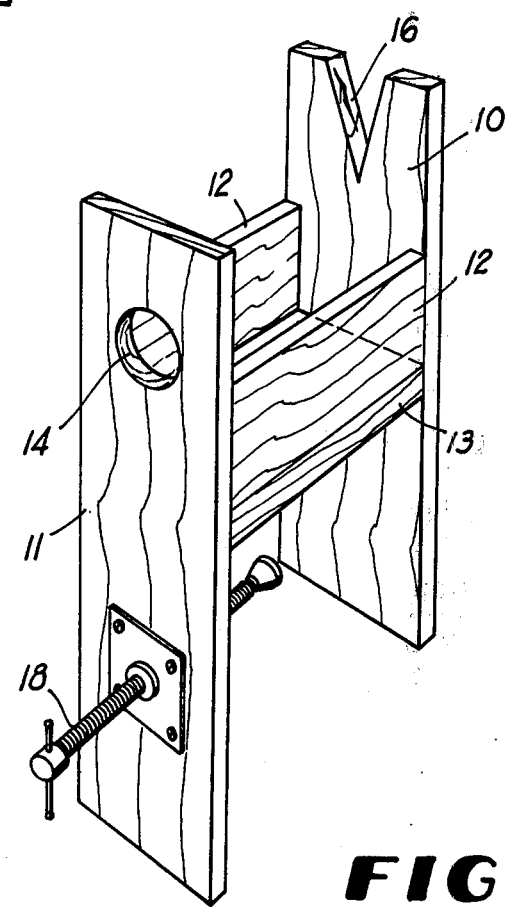
FIG. 2 is a perspective view of the invention.

Referring to the drawings in detail, wherein like numerals designate like parts, a preferably wooden fishing rod support and tackle holder embodying the invention comprises a forward flat rectangular panel or plate 10 and a rear flat rectangular plate 11 of similar dimensions arranged in spaced parallel relation to the forward plate 10. As shown in FIG. 1, the plates 10 and 11 may be of equal lengths and staggered vertically in the assembled device but this arrangement is not essential. For example, the lower end of the rear plate 11 could be foreshortened to terminate in alignment with the lower end of the plate 10.

Near the longitudinal center of the plate 10 or slightly above this point, the two plates 10 and 11 are permanently rigidly interconnected by a U-cross section trough or channel having spaced parallel side walls 12 and a bottom wall 13, all formed from flat wooden plates and joined to each other and to the plates 10 and 11 by conventional means. The top of the trough interconnecting the spaced parallel plates 10 and 11 is open for the reception in the trough of various accessory items, as previously noted. Additionally, the U-cross section trough is very rigid structurally and connects the two plates 10 and 11 with great strength so that the unitized device can withstand rough treatment.

Immediately above the top of the trough, the rear plate 11 has a through opening 14 to receive and support the handle 15 of a fishing pole or rod. The forward plate 10 is provided in its top edge and above the elevation of the opening 14 with a V-notch 16 to receive and cradle the rod handle portion 17 ahead of the customary reel. The invention serves equally well as a support for a simple country style fishing pole.

The device is particularly useful when fishing from a bridge where space is sometimes limited due to the presence of numerous fishermen crowding the bridge railing. For this purpose, the depending portions of the two spaced plates 10 and 11 below the trough bottom 13 may engage over the top rail or beam of a concrete bridge, or may similarly engage over a metal bridge railing. In either case, the bottom of the trough 13 rests on top of the railing R as shown in FIG. 1. In the case of a comparatively narrow metal railing, one plate 11 may be equipped with an adjustable clamping screw 18, as illustrated in the drawings. This also enables the device to be mounted on a boat gunwale or the like.

Concrete bridges have railings or top beams of generally standard width or falling within fairly close width dimensions. Because of this, the invention may be manufactured optionally without the clamping screw 18, in which case the lower end portions of plates 10 and 11 will simply straddle the concrete railing or beam with the bottom of the trough resting thereon. Due to the flatness of the plates 10 and 11, their parallelism, and the fact that they extend considerably below the trough, the holder will be sufficiently stable during use on concrete bridges without an adjustable clamping screw. Without the screw, the device is entirely unitary and rigid with no moving parts and can be formed entirely of wood for even greater simplicity and durability. In either case, with or without the screw, the invention forms a highly convenient support for a fishing rod or pole with the connecting trough serving the dual purpose of rendering the device very rigid and forming a convenient compartment for various accessories.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A fishing rod support comprising a pair of spaced substantially parallel plates, a trough section extending between and rigidly interconnecting said plates with the plate extending above and below and trough section in spaced relationship, and each plate forming an end closing an end of said trough and having opening means therein above the trough section to receive and support a fishing rod, the trough section being adapted to receive fishing accessories.

2. A fishing rod support as defined in claim 1, and said opening means in one plate comprising an opening substantially at the open top of the trough section and comprising in the other plate a V-notch formed through the top edge of the other plate and above the elevation of the trough section.

3. A fishing rod support as defined in claim 2, and an adjustable clamp screw carried by the lower end portion of one plate below the bottom of the trough section whereby the support may be held fixedly on support members of varying widths with the bottom of the trough section resting thereon during the use of the support.

4. A fishing rod support comprising a pair of spaced substantially parallel plates, a trough section extending between and rigidly interconnecting said plates with the plates extending above and below the trough section in spaced relationship, each plate having opening means therein above the trough section to receive and support a fishing rod, the trough section being adapted to receive fishing accessories, said plates being flat and elongated and being of equal widths, and said trough section including spaced flat parallel side walls and a flat bottom wall with the opposite ends of said side walls and bottom wall abutting the interior faces of said plates and the outer faces of said side walls being disposed substantially flush with the longitudinal edges of the plates so that the trough section spans substantially the full width of the plates and the plates close the ends of the trough section.

5. A fishing rod support as defined in claim 4 and said support formed of wooden members joined as a rigid unit.

6. A fishing rod support as defined in claim 4 and the plates of equal lengths and staggered longitudinally in the assembly support.

* * * * *